United States Patent
Snedden

(10) Patent No.: US 9,100,483 B1
(45) Date of Patent: Aug. 4, 2015

(54) PROPERLY ASCERTAINING SHIFT-RELATED WORK DEFICIENCIES OF CONTACT CENTER AGENTS

(71) Applicant: Noble Systems Corporation, Atlanta, GA (US)

(72) Inventor: Charles Snedden, Leven (GB)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 14/284,853

(22) Filed: May 22, 2014

Related U.S. Application Data

(63) Continuation-in-part of application No. 14/056,225, filed on Oct. 17, 2013, now Pat. No. 8,761,375, which is a continuation of application No. 13/838,913, filed on Mar. 15, 2013, now Pat. No. 8,594,303.

(51) Int. Cl.
*H04M 3/00* (2006.01)
*H04M 5/00* (2006.01)
*H04M 3/51* (2006.01)
*H04M 3/523* (2006.01)

(52) U.S. Cl.
CPC ............ *H04M 3/5175* (2013.01); *H04M 3/523* (2013.01)

(58) Field of Classification Search
CPC ................ H04M 2203/402; H04M 2203/401; H04M 3/5175; H04M 3/5133
USPC ............. 379/265.04, 265.03, 265.06, 265.02; 705/7.16, 7.12
See application file for complete search history.

(56) References Cited

U.S. PATENT DOCUMENTS

| | | | |
|---|---|---|---|
| 8,306,854 B1 * | 11/2012 | Bray et al. | 705/7.12 |
| 2014/0169548 A1 * | 6/2014 | McDaniel et al. | 379/265.06 |
| 2014/0200941 A1 * | 7/2014 | McDaniel et al. | 705/7.16 |

* cited by examiner

*Primary Examiner* — Thjuan K Addy

(57) ABSTRACT

A work schedule for an employee, such as a contact center agent, may indicate various time periods when the agent should be engaging in specific types of work activities during their work shift. During the work shift, the agent may indicate an activity code identifying a type of work activity the agent is presently engaged in. The agent may deviate from the planned work schedule in various ways, including by starting later than the scheduled start time or leaving earlier than the scheduled end time. The agent may be allowed to "make up" a work-related time deficiency by working through a scheduled break or working earlier or past their scheduling work shift. If the agent successfully makes up the work-related deficiency within a time limit, then no improper deviation from the planned schedule is noted. Otherwise, a work-related deficiency condition may be recorded.

20 Claims, 5 Drawing Sheets

PROPERLY ASCERTAINING SHIFT-RELATED WORK DEFICIENCIES OF CONTACT CENTER AGENTS

CROSS REFERENCE TO RELATED APPLICATIONS

This application is a continuation-in-part of U.S. patent application Ser. No. 14/056,225 filed on Oct. 17, 2013, which in turn is a continuation of U.S. patent application Ser. No. 13/838,913, filed on Mar. 15, 2013, the contents of both of which are incorporated by reference for all that they teach.

BACKGROUND

Contact center agents are typically scheduled to work in shifts that are defined by a start and stop time. Each work shift may also include one or more breaks, such as two short rest breaks (e.g., 10-15 minutes) and a longer lunch break (e.g., 30-45 minutes), during which time the agent is not required to be engaged in on-duty activities (e.g., handling communications). Agents who begin their work day late, or who are leaving work early, are not conforming to their scheduled shifts. It would facially appear that agents failing to adhere to their work schedule by arriving late or leaving early are exhibiting poor attendance habits. However, in various circumstances, such shift-related work deficiencies may be allowed, or even encouraged. Thus, not all schedule deviations should be treated as an improper attendance practice by the employee.

Many time management systems automatically record any deviation from a planned work schedule as undesirable. Agents may have these work-related deficiency instances tracked, and after a number of such occurrences within a time period, management may be alerted to review the situation with the agent. A cumulative number of such work-related deficiency instances may adversely impact the performance rating of the agent.

Even though the agent may be paid for only the time actually worked, an agent leaving early or arriving late may otherwise impact how the agent is paid (e.g., via bonus or future raises). Thus, both the agent and employer have an interest in accurately recording such occurrences. However, time management systems may not accurately detect when such work-related deficiencies are allowed, and a supervisor may have to manually intervene with the time management system to override the notation of such an occurrence. This requires additional time by the supervisor that detracts from the supervisor's other duties.

Addressing this issue requires a time management system that can properly detect when deviations from the work schedule are allowed and determine when such deviations should adversely impact the agent's attendance rating. It is with respect to these and other considerations that the disclosure herein is presented.

BRIEF SUMMARY

In general, embodiments of the present invention provide computer program products, methods, systems, apparatus, and computing entities for determining when an employee scheduled for a work shift is improperly adhering to their planned work schedule. In various embodiments, the employee may be a contact center agent and may deviate from a work schedule by leaving early or arriving late. Based on various conditions, a deviation from the work schedule resulting in a deficiency of time worked during their scheduled shift may be considered inappropriate. In other instances, a deviation from the work schedule may be allowable, and in such cases, the deviations should not adversely impact the agent's attendance record. In various embodiments, this determination may require examining the agent's work times outside the agent's scheduled on-duty times.

As is discussed in greater detail below, the subject matter disclosed herein may be implemented as a computer-controlled apparatus, a method, a computing system, or as an article of manufacture such as a non-transitory computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
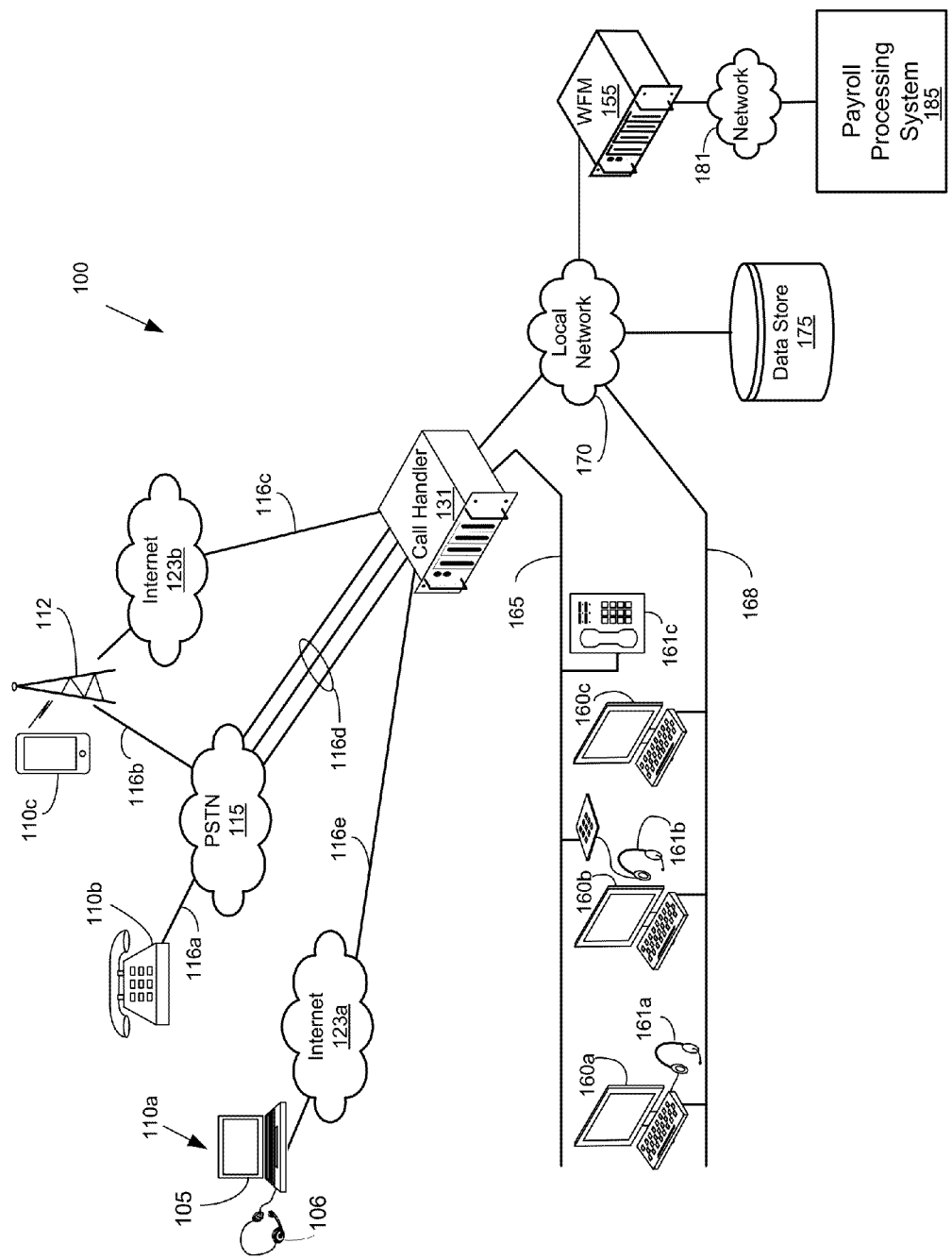
FIG. 1 shows one embodiment of a contact center architecture that may be used to practice the various concepts and technologies as disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Embodiments of the invention may be utilized in various industries, as will become apparent to those of ordinary skill in the art as they read the disclosure. The principles of the invention are illustrated using contact center agents as employees, but the concepts and technologies disclosed herein could be applied to other types of employees and industries.

Exemplary Contact Center Architecture

FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Thus, in some instances, the contact center may be referred to as a call center when referring primarily to the context of handling calls. Although many aspects of contact center operation are disclosed in the context of voice calls, in various embodiments, the contact center may process other forms of communication such as, for example, facsimiles, emails, text messages, video calls, and chat messages.

Since the contact center may handle calls originating from a calling party, or initiated to a called party, the term "party" or "remote party" without any further qualification, refers to a person associated with a call processed by the contact center, where the call is either received from, or placed to, the party. The term "caller," if used, will generally refer to a party communicating with the contact center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology. Inbound voice calls may also originate from a calling party employing a so-called "IP phone," "VoIP phone," or "soft phone" 110a. In one embodiment, this device may comprise a computing device 105, such as a laptop, computing tablet, or other electronic device, which processes voice data and interfaces with a headphone/microphone combination, also referred to as a headset 106. The computing device 105 may in turn be connected to an Internet 123a. Those skilled in the art will recognize that a variety of protocols and facilities may be used to convey voice calls.

In various embodiments, inbound calls from callers to the contact center may be received at a call handler 131, also referred to as a call handling system ("CHS") which could be, e.g., an automatic call distributor ("ACD"). In particular embodiments, the call handler 131 may be a specialized switch for receiving and routing inbound calls under various conditions. The call handler 131 may route an incoming call over contact center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the call handler 131.

In various embodiments, calls may be routed over facilities 165 by the call handler 131 to an agent for servicing. That is, for example, the party may speak with an agent to receive customer service. In other embodiments, the call may be routed using a local network 170 over facilities 168, to the agent's phone. An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device of the workstation, but which may be closely integrated with handling voice as well. Thus, for these particular embodiments, the workstation can be assumed to have at least a data capability and may have a voice capability.

Depending on the embodiment, the interaction between the call handler 131, agent computers 160a-160c, as well as other components, may involve using a local area network ("LAN") 170. In particular embodiments, when an agent is interacting with a called or calling party, the agent may use his computer 160a-160c to further interact with other enterprise computing systems. In addition to receiving inbound communications, including, for example, voice calls, emails, text messages, and facsimiles, the contact center may also originate communications to a called party, referred to herein as "outbound" communications.

In some embodiments, the call handler 131 may comprise a dialer, such as a predictive dialer, to originate outbound calls at a rate designed to meet various criteria. In various embodiments, such a call handler 131 is typically configured to dial a list of telephone numbers to initiate outbound calls. Data for the calls may be stored in a data store 175. After the calls are originated, a transfer operation may connect the call with an agent or a queue.

Finally, the contact center architecture 100 may include incorporate a workforce management component ("WFM") 155. The WFM maintains information regarding agent schedules, and may access forecasting data that is used to generate agent schedules to effectively handle inbound/outbound calls. These agent schedules may include scheduled break times. The WFM 155 may also maintain a log of historical agent activities, such as when any particular agent logged-in, logged-out, requested a break, or returned from a break. This information may be updated for each shift or at the end of each day. Typically, the WFM receives this information for each individual agent from the corresponding agent's computer 160, the call handler 131, or some other component, and then collates the work-related data into an aggregate agent work history log for the agents.

The WFM 155 may generate payroll information using the agent work history log. This may involve the WFM 155 transferring one or more work history logs via a network 181 to a payroll processing system 185. The payroll processing system then processes the agent work history log to generate payroll for the agents. In one embodiment, the time when the agent is logged-in to the call handler 131 is the time for which the agent is paid. Thus, when the agent is logged-off, it is presumed that the agent is not working. In some embodiments, the agent will not be paid for time when they are not logged-on. In other embodiments, the agent may be salaried, e.g., they are paid based on an anticipated work schedule independent of the exact number of hours actually worked each week.

In one embodiment, the payroll processing system 185 may be a separate service provider from the contact center. The payroll processing system may operate as a service that receives work data (e.g., time sheets) indicating when the agent was logged into the call handling system (and other types of work-related activities) and computes the payroll for the agents. In other embodiments, the functionality provided by the payroll processing system may be implemented by the contact center, including by integrating the functionality into the WFM. Other variations are possible, as well.

There may be coordination between the call handler 131 and the WFM 155 regarding the actual times when the agent is working, e.g., when the agent is "on-duty" and available to handle calls. In some embodiments, agents may use their workstation to indicate to the call handler when they are available or not, so that the call handler knows when to offer calls to the agent (or not). This information is initially received by the call handler and may be reported to the WFM. In some instances, a periodic log (e.g., hourly, daily, weekly) of such times may be reported to the WFM.

Although a number of the above entities may be referred to as a "component," each may be also referred to in the art as a "computing device," "unit" or "system." A server may incorporate a local data store and/or interface with an external data store. Use of the word "server" does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as-a-service" or "CaaS") to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in art will recognize FIG. 1 represents one possible configuration of a contact center architecture 100, and variations are possible with respect to the protocols, facilities, components, technologies, and equipment used.

Service Overview

Agents in a contact center are typically scheduled to work for certain times on specified days. Quite often, a work schedule is developed by the WFM 155 (or another system) for the agents in the contact center for an upcoming period, e.g., for the upcoming week or two. It is quite often that the schedules are generated in advance and provided to the agents so that they can plan accordingly. Frequently, changes to the generated schedules are required after they are distributed to the agents, but updated schedules are not necessarily generated. For example, merely because an agent may inform their supervisor that they are unable to attend work the next day (e.g., the agent has called in sick), the supervisor may make an ad-hoc schedule change without generating and distributing a whole new work schedule for the workforce.

From the agent's perspective, the time allocated for each day can be referred to as their "work shift" or simply "shift." The agent's work shift may be a full day, e.g., seven to eight hours. In other instances, the agent's work shift may be a partial day, e.g., a half-day comprising four to five hours. The exact times are based on the agent's willingness to work longer/shorter hours and the needs of the contact center. The overall work schedule may reflect different types of work shifts simultaneously for a group of agents.

Typically, various contact center policies and/or employment regulations require that the agent has rest breaks at certain times during their shift. The nature of these breaks can vary. One frequent type of break is termed herein a "rest break," also sometimes referred to simply as a "break." For a full-day work shift, there may be a rest break in the first half of the shift and another rest break during the second half. Another common break is a lunch break, which typically is longer in duration than a rest break and typically occurs mid-way through a full-day shift. Typically, a lunch break is not provided on a half-day shift.

Figure 2A:
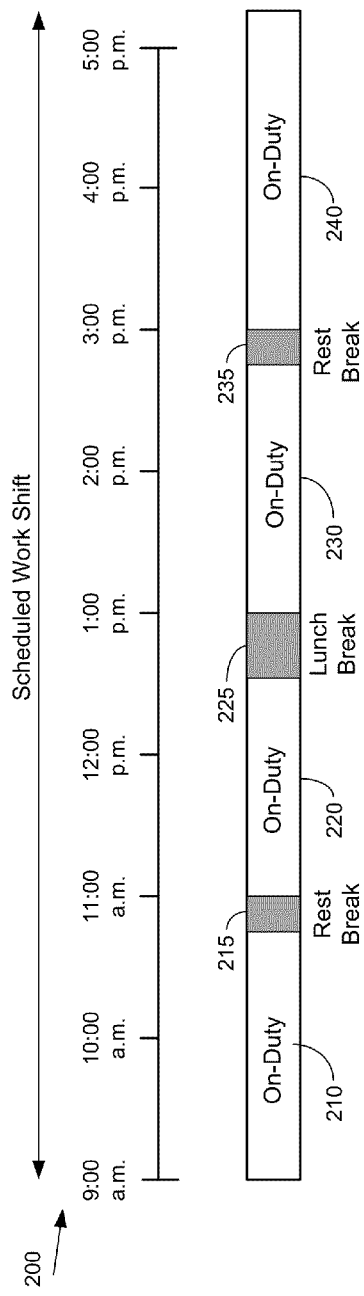
FIG. 2A illustrates one embodiment of a scheduled work shift for an agent comprising breaks and scheduled work times.

These concepts are illustrated in FIG. 2A, which shows an exemplary full day work shift 200 comprising a full day shift for a particular agent. The shift 200 is scheduled to begin at 9:00 a.m. and complete at 5:00 p.m. In normal circumstances, the agent is expected to start at the scheduled start time and not begin later or earlier than scheduled. Further, in normal circumstances, the agent is expected to work until the scheduled stop time, and not leave earlier than scheduled. Such deviations from the scheduled work shift may facially reflect an agent attempting to work less than their scheduled work time, referred to as a "shift-related work deficiency" or simply "work deficiency," while expecting to be compensated for the entire time of the scheduled work shift.

During the scheduled work shift, there are several times when the agent is scheduled to be "on-duty," e.g., engaging in their normal work, which may involve being available for handling calls. This includes a first time segment 210 between 9:00 a.m. to 10:45 a.m.; a second time segment 220 between 11:00 a.m. to 12:30 p.m.; a third time segment 230 between 1:00 p.m. to 2:45 p.m.; and a fourth time segment 240 between 3:00 p.m. to 5:00 p.m. Also shown are rest breaks 215 and 235 for fifteen minutes each starting at 10:45 a.m. and 2:45 p.m. A lunch break 225 is shown as beginning at 12:30 p.m. and continuing to 1:00 p.m. In one sense the agent is said to be "working" the entire time period from 9:00 a.m. to 5:00 p.m., meaning their scheduled work shift is bounded by these times. In another sense, the agent may be said to be "working" during their on-duty time periods of the work shift, whereas taking a break and other times during the shift are viewed as "not working." The determination of which meaning of "working" applies should be evident from the context of its usage.

The "on-duty" time periods 210, 220, 230, 240 means that the agent is scheduled to be available for handling a call, not that the agent is necessarily actually handling a call (or handling another form of communication). In many instances, the agent may be waiting for a call to occur. In other instances, the agent may have completed handling a call with a customer and may be performing various activities to "wrap-up" the matter. This is called "after call work" ("ACW") time.

As noted above, this particular example of a work shift 200 shown in FIG. 2A includes various breaks scheduled at certain times. The contact center may have a number of agents and the scheduling of these breaks is typically staggered. Normally, it is undesirable for all agents to take their lunch break or rest break at the same time, as this may result in an insufficient number of agents available to handle calls. Thus, some agents may start a first break at 10:45 a.m. and others may start their first break at 10:30 a.m. This ensures, e.g., that sufficient numbers of agents are available to handle calls at all times. The contact center may allow limited flexibility in agents to modify their breaks.

Similarly, the starting and stopping times of agents for their respective shifts may be staggered on any given day. For example, call volume may start out low at 8:30 a.m. and rise to a steady level by 9:30 a.m., and similarly diminish at the end of the day. Thus, agents may have staggered start and stop times (e.g., some start at 8:30 a.m. and others at 9:15 a.m. or other variation thereof) to more effectively match the number of agents to the expected call volume.

Although FIG. 2A only identifies rest breaks and lunch breaks for the agent, there are other forms of work-related activities that may be allowed in a contact center and each contact center may define what types of work-related activities that employees may be engaged in. These may be categorized differently so that agents' work activities can be tracked, analyzed, and reported to management. For example, contact centers may define a "smoking break," which allows employees who are smokers to leave their work position to go to a designated smoking area. Other types of breaks may be "bathroom" breaks or so-called "health-breaks." These breaks may be taken as needed, and may be shorter than a rest break. These breaks may be personal in nature or business oriented. Other activities may be defined for "emergency" reasons, training purposes, coaching, etc.

It is common in some contexts to refer to non-on-duty activities as "breaks" in a generic sense. For example, an agent may refer to an activity as a "training break" even though this is not the same as a rest break. Thus, some agents may consider a "break" to be any activity when the agent is not on-duty handling calls. However, a "training break" is not the same as a "rest break," even though in both instances the agent is not handling calls. To avoid confusion, reference is made to a work "activity," which refers to the nature of the activity engaged in during a specific time period. For example, an "on-duty" activity refers to when the agent is available to handle calls. A "training" activity refers to a time when the agent is being trained on, e.g., new calling campaign details. A "break" activity could be a rest or lunch break. There are other forms of activities that may be defined where the agent is involved in work activities, although not directly handling calls.

Activities are often initiated and/or terminated by the agent interacting with the call handler using their computer. A non-on-duty work activity (such as a rest break) will result in suspending calls being offered to the agent. Once the agent leaves, the agent should return by the end of the break, but as it can be imagined, this may not always happen. Thus, these systems typically are not configured to automatically resume offering calls to the agent at the end of the break, since the agent may not be at their position. Rather, the call handler may resume offering calls to the agent only after the agent signals their return to their workstation.

In addition to returning late from a scheduled break, another concern is the agent may take an unscheduled break, such as a smoking break, and the agent may not return in a timely manner. Similarly, the agent may start their scheduled work shift late or end their work shift early. These various examples may lead to a work deficiency of agent work time, or more precisely, a deficiency of the agent's cumulative on-duty time for their shift.

Typically the agent is required to indicate using their workstation the nature of the activity they are engaged in, such as when they are beginning their work shift, ending their work shift, requesting a break, and returning from the break. Further, if an agent is taking a break, then the agent typically indicates the type of break that is being taken. In addition to controlling the processing of calls for that agent, this also allows the call handler to track the number and types of breaks taken, and allows statistics to be developed regarding the duration of activities, and how well an agent adheres to their schedule. Further, management may rate and evaluate agents based on their schedule adherence and payroll systems may compute an agent's compensation based on this as well.

Thus, it is apparent that is important to know all the various activities the agents are engaged in at any time. Agents indicate their ability to start handling calls (or other forms of communications) at the beginning of their shift by logging into their workstation. Reference to "logging in" means that the agent is now ready to start their shift. Similarly, "logging out" means that the agent is no longer able to handle calls at the end of their shift.

Agents may request the beginning of a break activity by invoking a "pause" function at their workstation. This typically results in sending a pause message to the CHS which in turn ceases offering further communications to the agent. Invoking the pause function typically allows any existing communications with the agent to be maintained and completed, but prevents future communications from being offered. However, pausing an agent does not log-out the agent. For example, an agent can be involved in a call and invoke the pause command to prevent any further calls being offered to the agent after the agent completes the call and further completes their ACW activities. In addition, in particular embodiments, the pause may function to cease routing other forms of communications to the agent such as, for instance, texts, web chats, emails, etc.

An agent that logs in/out or invokes a pause may enter or select an activity code that indicates further information regarding the activity of the agent. In various embodiments, an activity code indicating a break is called a "pause code." A pause code can be considered as a special case of an activity code.

In certain embodiments, the contact center can automatically invoke a pause command on behalf of the agent. This may occur after completing a call. For example, it may be expected that after completing a call, the agent will have some ACW to perform, and the CHS may automatically invoke a pause indicating the ACW activity code. The CHS may also automatically invoke a break by sending an appropriate break activity code when a scheduled break arrives. However, automatically invoking a pause may not be feasible for unscheduled breaks (e.g., a bathroom break). Thus, an agent typically must at least manually enter a pause command (e.g., a specific activity code) for an unscheduled break. When the agent completes their break, they can enter a "resume" command to indicate the break is over which may result in e.g., an "on-duty" activity code being sent. In many instances, it is not feasible for the contact center to automatically invoke the resume command for scheduled breaks, since if the agent is not present or not ready to resume handling calls, any calls directed to that position will not be handled properly.

In various embodiments, the activity code informs the contact center (including the CHS or WFM) of the purpose or nature of the break. For instance, depending on the embodiment, the activity code may be inherent in the type of pause message sent or may be a parameter in the message sent.

As can be expected, there may be a myriad of defined activity codes that an agent may enter. These codes may be referenced as a mnemonic, word, or phrase, which translates to a numerical code. The number of activity codes defined may vary in various embodiments, and a partial list of potential codes are provided below. Different codes may be defined as shown in Table 1.

TABLE 1

| Activity Code | Explanation |
|---|---|
| Work | Handling Calls |
| After Call Work | Activities associated with follow up matters associated with a completed call |
| Break-10 | 10 Minute Break, other activities codes may indicate other types or duration of break. |
| Bathroom Break | Restroom Break, typically unscheduled and of variable duration, but may be capped at 10 minutes. |
| Lunch-30 | Lunch Break - 30 minutes |
| Excused Delay | Excused delay from regular work, typically unscheduled and of variable length |
| Unexcused Delay | Unexcused delay - e.g., tardiness or early departure |
| Meeting | Group Meeting |
| Sick | Unanticipated illness |
| Training | Attendance in a training session |
| Mentoring | Aiding in career development of another agent. |
| Center Holiday | Defined holiday for contact center |

There may be any number of activity codes defined based on the needs of the contact center management to monitor particular activities. The above list is not intended to be a complete list nor a list of required activity codes.

In many instances, a pause (and its corresponding "resume") for implementing a break is generally viewed as preferred as compared to approaches based on logging-in and logging-out the agent. First, the pause/resume process may be easier and quicker for the agent to complete as opposed to logging-in and logging-out. Second, the CHS typically performs various functions when an agent logs-in or logs-out. For example, the CHS may load and process various agent-specific information and update various databases and systems each time an agent logs-in. Similarly, when the agent logs-out, cached information may be stored and other systems may be updated. Thus, using a log-in/log-out approach for taking a break may not be preferred as it may unnecessarily increase processing in the contact center. Further, it may significantly complicate analysis of the breaks, since in many instances a log-out for a break appears to be the same as a log-out at the end of a shift. Thus, a log-out by itself without any indication of why it occurred cannot be analyzed to ascertain the reason for the log-out, nor does it allow easy prediction of its expected duration. Typically, in many contact center implementations, after an agent logs-out, the agent is not considered as working (i.e., they are "off-the-clock"). Thus, while logging off an agent may reflect the agent is not on-duty, it may not reflect the agent is on a break or engaged in some other type of work-related activity.

During normal circumstances, an agent indicates the appropriate activity code to the CHS (or other appropriate system) and the activity code should correspond to the activity indicated on the work schedule for the agent. Thus, returning to FIG. 2A, entry of an activity code indicating the agent is on-duty (which could be sent as a result of logging in) should occur around 9:00 a.m. Similarly, activity codes corresponding to the various breaks would occur when scheduled, and the agent would log-out at approximately 5:00 p.m.

In particular embodiments, mechanisms may be defined for measuring and reporting how many and what type of breaks an agent has taken. Further, mechanisms may compare various activities of an agent to past agent behavior and/or compare an agent's activities with respect to other agents. Thus, reports may indicate whether an agent is taking more time in breaks relative to the average times of other agents. Exceptions may result in sending notifications to supervisors or highlighting agents on a dashboard indicating an agent has taken more than the expected time for a break, has arrived late, or has left early relative to their scheduled work shift. Facially, it would appear that when the agent fails to adhere to their schedule, an adverse notation reflecting an attendance deficiency event should be recorded for that agent.

Figure 2B:
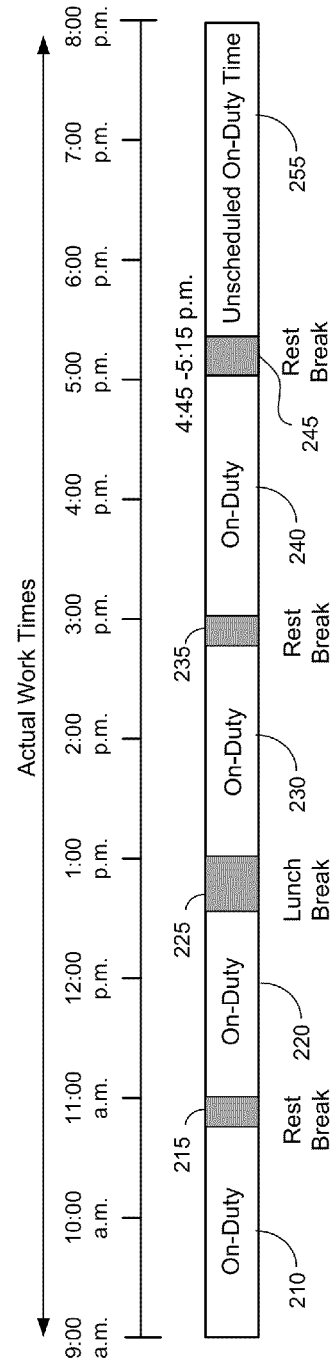
FIG. 2B illustrates one embodiment of the actual work times of the agent relative to the scheduled work shift shown in FIG. 2A.

However, an agent failing to adhere to their work schedule and resulting in a work-shift deficiency does not always reflect inappropriate behavior. For this, FIG. 2B is referenced. FIG. 2B reflects the actual work times for an agent whose scheduled work shift is shown in FIG. 2A. According to FIG. 2A, the agent should start their work shift, their morning rest break 215, their lunch break 225, and their afternoon rest break 235 all at the appropriate indicated times. However, a deviation is observed with their late afternoon work time 240 in FIG. 2B. Specifically, their afternoon work time 240 ends at 4:45 p.m. instead of at 5:00 p.m. as scheduled. This results in a deficiency of on-duty work time. This is then followed by a rest break 245. In addition, the agent is now resuming work during a period 255 from 5:15 p.m. to 8:00 p.m. when they were not scheduled to be on-duty. However, this latter deviation does not result in a deficiency of on-duty work time, but rather results in a surplus of on-duty work time.

To summarize, a rigid comparison between the actual work time and the agent's scheduled work time during the shift reflects several deviations. First, the agent should have ended their shift at 5:00 by logging out. Instead, the agent entered an activity code representing a break 245 at 4:45 p.m. Further, the agent resumed working at 5:15 and continued to 8:00 p.m., when they were not scheduled to work.

A simple explanation for such a deviation may be that the contact center supervisor requested the agent to extend their work day to 8:00 p.m. because another agent reported they would be delayed in arriving for their evening shift. The agent may have been willing to extend their work day, but required an evening rest break 245 to eat dinner before working the additional unscheduled work time 255. Consequently, the agent started an unscheduled rest break 245 prior to the end of their scheduled shift, which resulted in a shorter than scheduled on-duty time 240.

It is not unexpected that some agents may arrive late to their shift in a contact center, and the likelihood increases as the number of agents working in the contact center increases. Thus, if a contact center employs hundreds of agents, it can be expected that on any given day there is a significant probability of at least one agent arriving late due to various circumstances. Management may react to such circumstances by asking one or more currently working agents to extend their shifts. In other embodiments, the agent may work additional time in order to handle increased call volumes in the contact center.

There are a number of other circumstances that may cause an agent's actual work times to deviate from their scheduled work time. For example, an agent may work their scheduled day shift and an evening shift (e.g., a "double shift") in return for being allowed to arrive late the following day. In another situation, an agent may arrive early relative to their scheduled start time, and may be allowed to leave early for the same amount of time. In another situation, an agent may arrive late and may be allowed to "make up" this time by staying late the same amount of time after their scheduled completion time.

These scenarios illustrate that merely failing to adhere to a scheduled start or stop time does not necessary mean that the agent has inappropriate work attendance habits. In cases where the agent is taking an early break in order to work a double shift at the request of management, such behavior is actually desirable, as it demonstrates flexibility by the agent to meet unanticipated scheduling demands.

In addition, agents may deviate from their shift schedules by substituting one work activity for another. Returning to FIG. 2A, an agent may be expected to begin their work day at 9:00 a.m. by logging into the CHS and handling calls. However, contact center management may have, instead, instructed the agent to attend a training session (or engage in some other non-on-duty activity). In this case, the agent may engage in a training session from 9:00-9:30 a.m., and log-in to the CHS at 9:35 a.m. Although the agent appeared to have started their shift late (e.g., at 9:35 a.m.), they in fact, did arrived at the required time and followed management instructions.

Some call handler systems may allow the agent to retroactively enter a training activity code for the time period between 9:00 and 9:30. If the agent's work schedule indicates the training is scheduled, then a comparison between the activity code entered by the agent and the scheduled activity for the time period can verify that the agent has complied with the scheduled activity. However, in many instances, the training session may not be planned when the work scheduled was generated, and hence the training session may not appear on the agent's work schedule. Of course, the supervisor could generate a new schedule for the contact center showing the training session, but this takes time away from the supervisor's other duties and becomes impractical for every change. The supervisor may simply instruct the agent to enter a "training session" activity code into the time management system and this should be interpreted as a legitimate work activity by the time management system. Thus, the agent should not be noted as having starting work late (e.g., having a shift-related work deficiency).

As noted, it may be occasionally necessary for an agent to enter an activity code different from what is scheduled. Thus, even though the agent is scheduled to be handling calls (e.g., on-duty), the agent may instead be required to engage in some other activity and the resulting shift-related work deficiency should not reflect adversely on the agent. However, mechanisms are required to ensure that agents do not inappropriately enter a substitute activity code. For example, an agent that is late in starting their shift may instead enter a different code to mask that they arrived late and thus started handling calls late. For example, an agent scheduled for 9:00 a.m. and arriving at 9:15 a.m. may enter an activity code for a bathroom break from 9:00 a.m. to 9:15 a.m. Or, the agent may instead enter an activity code indicating that they were attending a training session, when in fact, they were not.

Several mechanisms may be adopted to prevent or detect such inappropriate behavior. First, reports may be generated that indicate how much time an agent spent in a particular activity. An agent's total time for each activity may be compared to an average time based on the population of agents. Thus, if an agent is inappropriately reporting too many bathroom breaks, their cumulative break time for a time period (such as a week or a month) may exceed the average of other agents. Such agents will have a higher than average time for a particular activity code and they could be flagged in a report provided to management. Further, reports could be generated in which the scheduled work shift for the agent is over-laid with the actual work activities of the agent, allowing easy visual detection of any anomalies. Alternatively, such anomalies can be detected via processing the activities codes in comparison to the schedules. For example, a single agent recording attendance at a "group meeting" when no other agents recorded such an activity code for the same time raises suspicions as to whether the agent properly entered the activity code or was actually engaged in such activity.

Second, agents may be prevented from entering certain codes in certain circumstances. For example, an agent may be precluded from entering a holiday activity code that is for 15 minutes in length. The current day may not have been defined as a holiday, and further, that code may be limited to only being used for a full shift. That is, rules may preclude the agent from entering a holiday activity code for a time period of less than eight hours. In other cases, agents may be limited to entering codes based on their duties. For example, a relatively junior agent may be precluded from entering a "mentoring" activity code, since that agent may not be allowed to mentor other agents. The use of the "mentoring" activity code may only be allowed for use by senior agents or supervisors.

Third, a priority code scheme may be defined to determine whether an activity code can be entered. This requires a priority code to be allocated to each activity code and to each scheduled activity on the agent's schedule. In one embodiment, the agent is allowed to enter an activity code if the corresponding priority code is the same or higher than the priority code for the scheduled activity.

An example using FIG. 2A can illustrate the use of priority codes. Assume that the on-duty activity 210 scheduled at the beginning of the agent's has a priority code of 10. Further, assume that a "work" activity code also has a priority code of 10. When the agent logs on at the beginning of their shift using the "work" activity code, the priority code of the indicated activity is the same value or higher value as the scheduled activity. Thus, the agent is allowed to enter this code. If the agent was involved in a training meeting from 9:00 to 9:30, and then logs in at 9:35, then the agent may indicate a "training" activity code from 9:00 to 9:30. The "training" activity code may have a higher priority, e.g., 20. The agent is allowed to enter this activity code, since its priority is higher than 10, which is the value assigned to the scheduled activity.

The system may also assign different priority codes for an agent's different scheduled work intervals. Returning to FIG. 2A, there are four time periods where the agent is expected to be on-duty, 210, 220, 230, and 240. These may have different priority codes. For example, the first on-duty time period 210 may have a priority code of 40, then the second on-duty time period 220 may have a priority code of 30, the third on-duty time period 230 may have a priority code of 20, and the last time period 240 may have a priority code of 10. The "lunch" priority code may be assigned a value of 30, so that it cannot be entered during the first on-duty time period 210. However, it could be entered during the second on-duty time period 220 (thus allowing an early lunch break) or anytime thereafter (thus allowing a late lunch break). If the contact center management did not want to allow agents to take an early lunch, then the lunch activity code may have a priority of 25, so that it cannot be entered prior to completion of the second on-duty time period 220.

Returning to FIG. 2B, the fourth on-duty scheduled time period 240 is ended early with a rest break 245. This could correspond to an "excused" activity code with a very high priority, so that the agent can always enter an "excused" activity code.

The contact center can then define the appropriate rules for processing the various activity codes with respect to agent compensation. For example, "unexcused" breaks may result in the agent not being paid for that time, but "excused" breaks may be included in the compensation calculation. Correspondingly, the priority code may be defined so that unexcused breaks may be entered by an agent at any time, but excused breaks may be limited as to when they can be entered.

In other embodiments, management permission may be required for acceptance of a certain type of break entered by an agent. In this way, contact center management is aware of the actions of the agent with respect to taking breaks.

Process Flows

Figure 3:
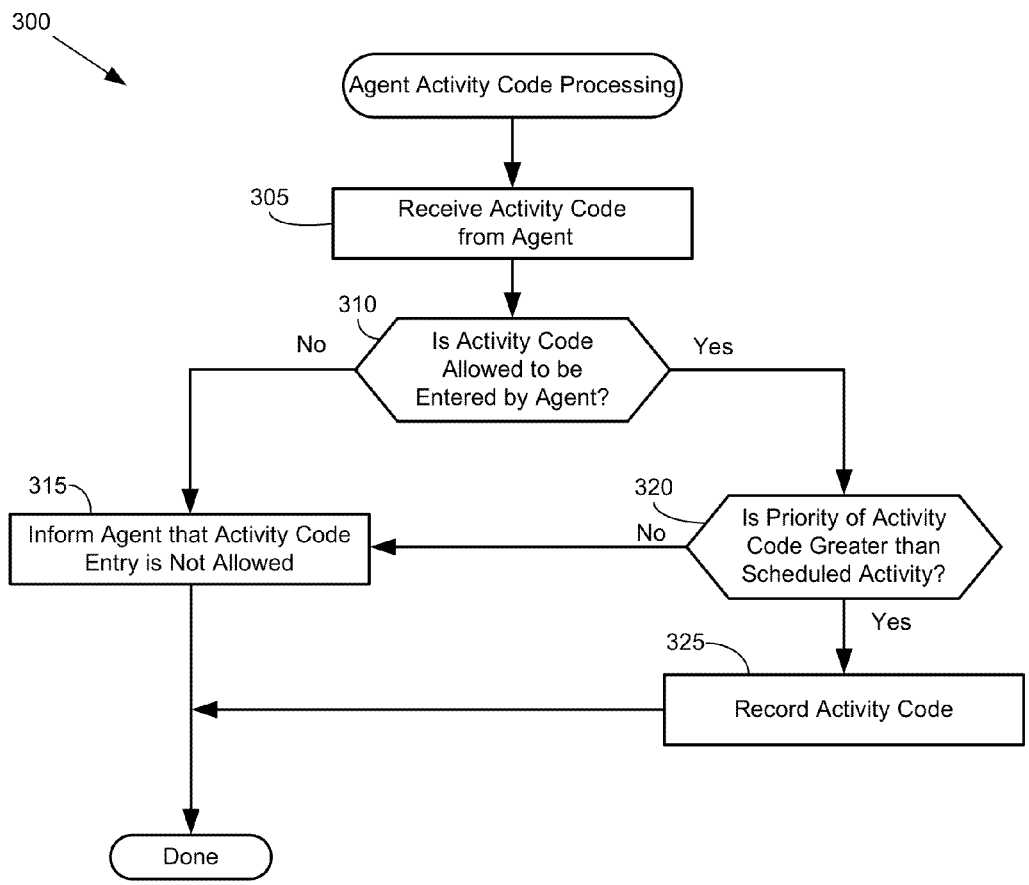
FIGS. 3-4 illustrate embodiments of process flows related to processing an activity code entered by an agent reflecting the nature of a work-related activity of the agent.
Figure 4:
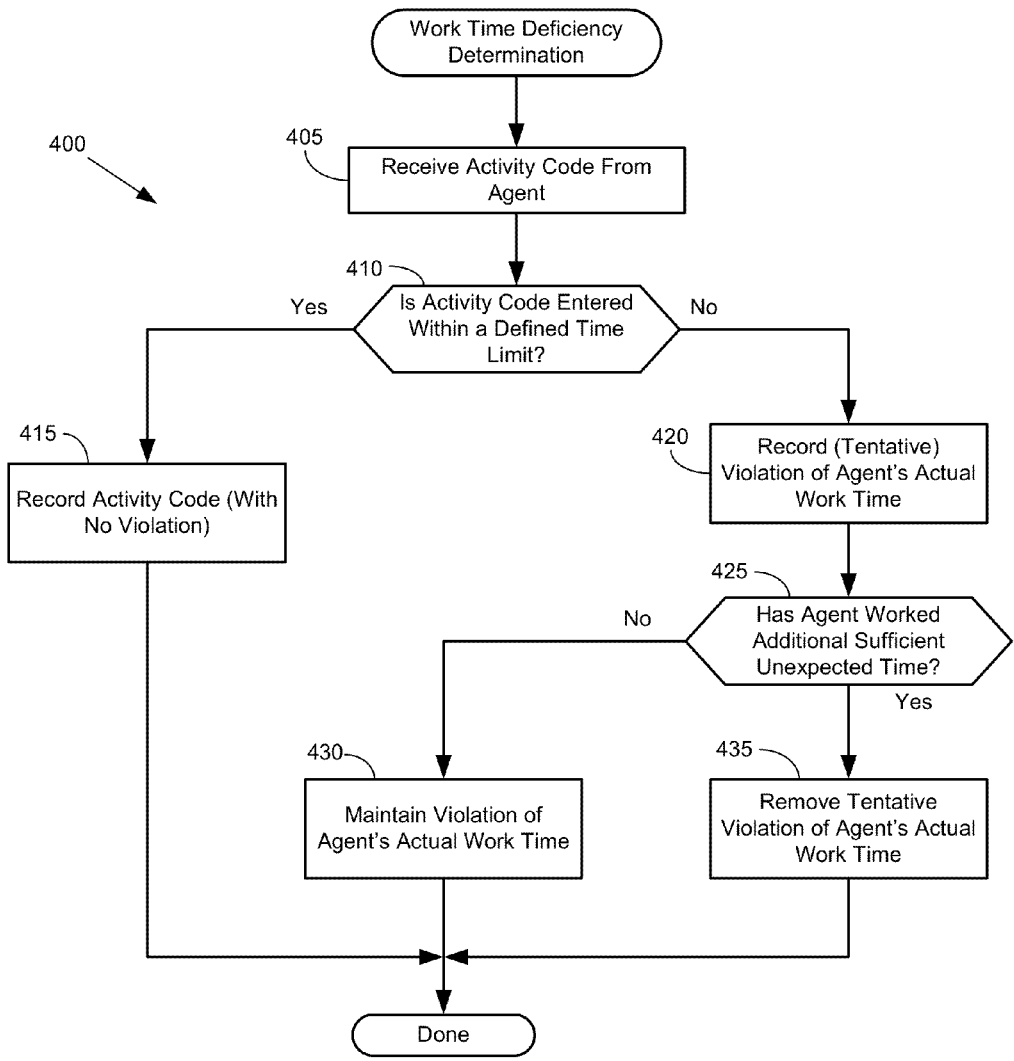

The operation of one embodiment illustrating application of the concepts is reflected in the process flows of FIGS. 3 and 4. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Turning to FIG. 3, the process flow 300 involves processing the activity code provided by the agent using various tests to determine whether the activity code can be acted upon for its intended purpose. The process begins in operation 305 with receiving the activity code from the agent. An optional test may be performed in operation 310 to see whether the activity code can even be invoked by the agent. Certain activity codes may be unavailable to certain agents. For example, only supervisors or senior agents may be allowed to mentor junior agents, and thus junior agents may be restricted from entering a "mentoring" activity code. Other restrictions may limit which activity codes can be entered at what times and by which agents. Other rules may limit the time periods that can be indicated with a particular activity code. For example, the "holiday" activity code may require the full duration of the shift to be entered, or the "bathroom break" activity code may be limited to 15 minutes. Restrictions of which activity codes can be used may be defined on a per-agent basis, a per-campaign basis, a per-agent experience level basis, etc.

If the agent is not allowed to enter the activity code in operation 310, then the process continues by informing the agent that the code is not allowed in operation 315. The agent may be prompted to enter a new code (not shown), or the process may be considered as complete.

If the agent is allowed to enter the activity code in operation 310, then a second test occurs to determine whether the priority associated with the entered activity code is equal or greater than the priority code of the corresponding scheduled activity. As discussed earlier, certain activity codes may be limited as to when or whether they can be entered relative to the scheduled activity. If the priority code is such that entry is not possible as determined in operation 320, then the flow continues to operation 315 where the agent is informed that entry of the activity code is not allowed. If the priority code is such that the activity code can be entered, then the process flow continues to operation 325 where entry of the activity code is performed.

The process flow of FIG. 3 only determines if the activity code entered by the agent is allowable. It is possible that entry of the activity code may be allowed, but a separate determination is required as to whether the agent has inappropriately deviated from the currently scheduled activity for that agent, thus causing a work-related shift deficiency (such as, e.g., leaving early or arriving late). This determination is reflected in FIG. 4.

FIG. 4 is a process flow which can ascertain whether the agent has improperly deviated from their schedule when prematurely ending a work shift. Such occurrences may be recorded and compiled for the agent, and may be used in future evaluations or in other ways. Recall the example of an agent asked to work a double shift by management, but is allowed to take a break near the end of their scheduled shift, thus ending their regular work shift activity early. In such instances, it may not be possible to ascertain whether the premature ending of a work activity was allowable until subsequent activities are examined. In other words, the taking of the additional break is allowed, provided that the agent does follow through and work the double shift. If the agent did not work the double shift, then ending their shift early by taking a break would not be allowed.

In another example, an agent may have arrived late, but has subsequently worked after their scheduled end time, and may be deemed as making up for their missed working time. Such unscheduled work time may be called "make-up" time. The time being made up may reflect a deficiency in the on-duty time of the agent performing the make-up time or a deficiency by some other agent. In such circumstances, the agent's work behavior by providing make-up time is commendable, and no notation of a work-related shift deficiency is recorded.

The process 400 begins in operation 405 with receiving an activity code entered by an agent. Next, a test is performed in operation 410 to determine whether this activity code is entered within an appropriate time limit in regards to the time of the scheduled work activity. For example, agents may be given a certain amount of leeway with respect to starting their shift, ending their shift, or taking a break. An agent expected to start their shift at 9:00 a.m. may be allowed several minutes leeway, so that they may be able to start at 8:55 or 9:05 without being considered as starting early or late. This threshold may be set to different values in a contact center with respect to different activities. For example, agents may be required to log-in within three minutes of their scheduled start time at the beginning of the shift, but may take lunch anytime within twenty minutes of their scheduled lunch break time. Similarly, agents may be required to end their shift within fifteen minutes of the scheduled end time, either before or after. Or, the time limit could be set to zero, which essentially provides no leeway time to the agents. Or, the time limit could be set to zero minute for before the scheduled end time and up to fifteen minutes after their scheduled end time.

If the agents enter an expected activity code within the time limit in operation 410, then the activity code is acted upon and recorded in operation 415 without any indication of an attendance violation by the agent. Thus, an agent logging in at 9:01 is not necessarily considered as starting "late." On the other hand, if the time limit is set to zero minutes, then logging in at 9:01 would be considered as starting "late." The determination of whether an agent has started late or not may impact how the subsequent additional working time is viewed. For example, an agent starting late and working past their scheduled time may be viewed as making up a time deficiency, whereas an agent starting on time and working past their scheduled time may be viewed as accumulating additional time.

If the entered activity code is not within the time limit associated with the scheduled activity in operation 410, e.g., the activity code entry exceeds the time limit, then a tentative work-related deficiency is recorded in operation 420. This is a tentative recordation of a violation since it is possible the agent may subsequently "make-up" the on-duty time. This "make-up" time may be equal to, or greater than, the time by which the time limit was exceeded in operation 410.

Next, a test is made to determine whether sufficient make-up time was worked in operation 425. This may necessarily require processing at a later time than when the activity code is entered in operation 405. For example, to ascertain whether an agent arriving late is going to provide make-up time at the end of the shift typically requires waiting until the end of the agent's scheduled shift. The test in operation 425 ascertains whether the agent has worked the additional sufficient unexpected time. For example, an agent arriving 20 minutes late would have to work at least 20 minutes to make up for the deficiency. Similarly, an agent arriving 20 minutes early would be allowed to leave no more than 20 minutes early. Failing to do so may constitute a work-related deficiency that is recorded for that employee. This necessarily means that any time worked when the agent is scheduled to work (e.g., their next work shift) cannot count as make-up time, as it is scheduled work time. Specifically, make-up time requires the agent to work when they are not expected to be working, either during a break or before/after their scheduled shift.

There may be a time limit as when the agent may engage in providing the make-up time. The agent may be required to do so before the beginning of their next shift, within the next 24 hours, or by the end of the week or scheduling period. Other time limits may be defined. Otherwise, it may become difficult and/or impractical to correlate the additional working time as make-up time.

If the agent has provided sufficient make-up time in operation 425, then any tentative indication of an attendance violation, tardiness, or other adverse notation is removed in operation 435. The agent has essentially made up the time as required. On the other hand, if the agent has not provided sufficient make-up time in operation 425, then the violation in operation 430 is maintained. The violation may be a notation or other information indicating that the agent has inappropriately deviated from their work schedule.

The process flow in FIG. 4 is premised on the agent arriving late and making up the time at a subsequent time by working past their scheduled end time. The agent may provide the make-up time by working during a break, instead. Further, a similar process flow could be defined allowing an agent to arrive early so as to be allowed to leave early without any violation being recorded. Again, there may be a limit defined as to how far apart time wise these activities can occur. Other scenarios may be defined for how an agent could provide make-up time.

In another embodiment, the agent may provide make-up time over a plurality of days. Thus, an agent may work two double-shifts in a week. In other embodiments, several instances of make-up time could be combined to compensate for a single work-related deficiency. For example, a four hour work-related deficiency occurring on a single shift could be made up by working additional an addition hour for the next four shifts. Furthermore, such arrangements could allow the agent to accumulate excused time off for the future.

In addition, rules may be defined as to which agents are allowed to engage in providing make-up time. For example, certain agents (e.g., senior agents) may be allowed to engage in make-up time, while other (e.g., junior) agent may be prohibited from doing so. Supervisors may define which agents are allowed to provide make-up time. In other embodiments, rules may be defined as to when make-up time may occur. For example, agents may be allowed to provide make-up time by working through a lunch break, but not by working before or after their scheduled shift time.

Exemplary Processing Device Architecture

Figure 5:
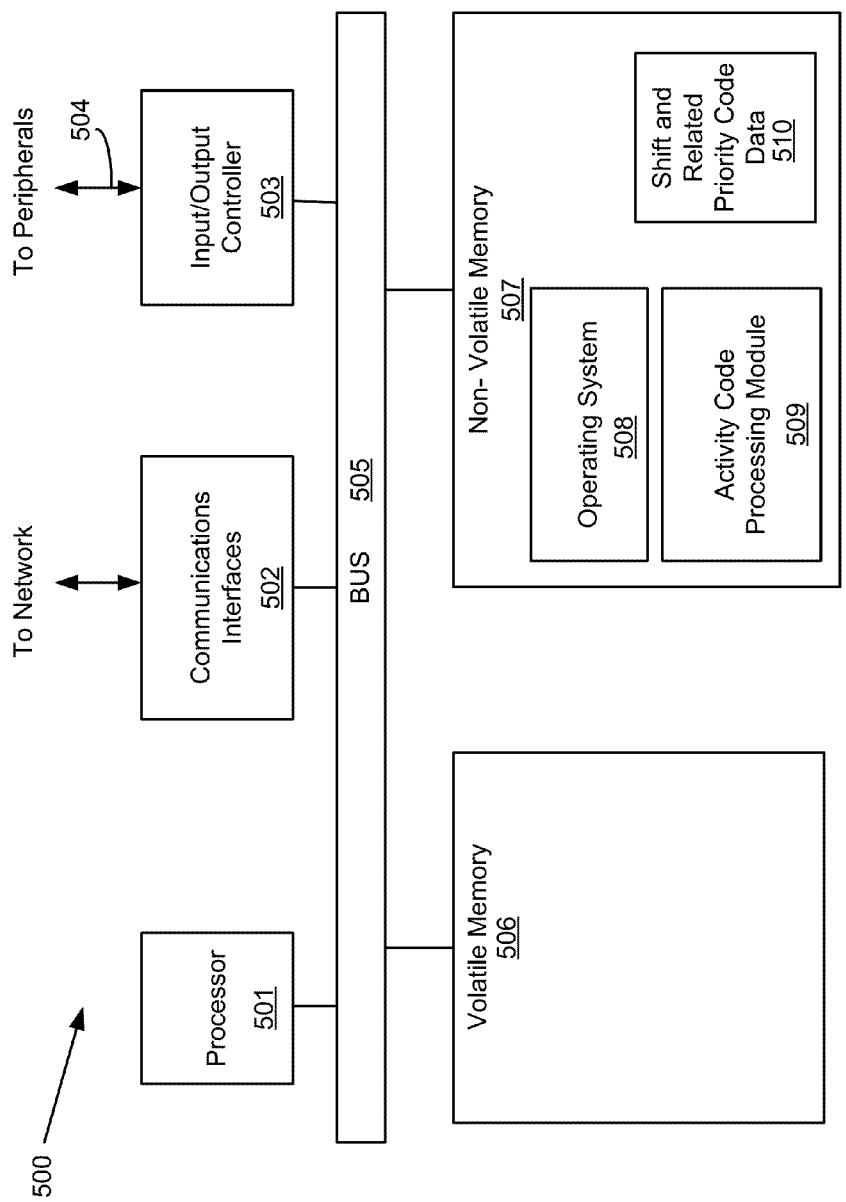
FIG. 5 illustrates an architecture of a component comprising a processor in a contact center for practicing the concepts and technologies disclosed herein.

As discussed in conjunction with FIG. 1, the contact center architecture 100 may comprise various components that comprise a processing system. FIG. 5 is an exemplary schematic diagram of a processing system 500 that may be used in an embodiment to practice the technologies disclosed herein. Specifically, this could be implemented as a software module executing in the agent computer, WFM, CHS, or other component shown in FIG. 1. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 5, the processing system 500 may include one or more processors 501 that may communicate with other elements within the processing system 500 via a bus 505. The processor 501 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 500 may also include one or more communications interfaces 502 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 503 may also communicate with one or more input devices or peripherals using an interface 504, such as, but not limited to: a keyboard, a mouse, a touch screen/display input, microphone, pointing device, etc. The input/output controller 503 may also communicate with output devices or peripherals, such as displays, printers, speakers, headsets, banner displays, etc.

The processor 501 may be configured to execute instructions stored in volatile memory 506, non-volatile memory 507, or other forms of computer-readable storage media accessible to the processor 501. The volatile memory 506 may comprise various types of memory technologies, including, but not limited to: random access memory ("RAM"), dynamic random access memory ("DRAM"), static random access memory ("SRAM"), and other forms well known to those skilled in the art. The non-volatile memory 507 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 507 may store program code and data, which also may be loaded into the volatile memory 506 at execution time. Specifically, the non-volatile memory 507 may store one or more computer program modules, such as an activity code processing module 509, and shift and related priority code data 510, and/or operating system code 508 containing instructions for performing the process and/or functions associated with the technologies disclosed herein. In addition, the activity code processing module 509 generate or access the shift data 510 (that may include the agent work schedule) in the non-volatile memory 507, as well as in the volatile memory 506. The volatile memory 506 and/or non-volatile memory 507 may be used to store other information including, but not limited to: records, applications, programs, scripts, source code, object code, byte code, compiled code, interpreted code, machine code, executable instructions, or the like. These may be executed or processed by, for example, the processor 501. These may form a part of, or may interact with, the activity code processing module 509 and/or shift and related priority code data 510.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. For example, the principles and concepts have been illustrated by contact center agents, but may apply to other types of employees and other types of business environments.

Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for determining a work-related shift deficiency comprising:
   generating a work schedule by a scheduling system, the work schedule comprising a shift for an employee, the shift having a shift start time and a shift stop time;
   receiving a first indication from the employee at a time management system, the first indication indicating a work start time that is subsequent to the shift start time;
   receiving a second indication from the employee at the time management system, the second indication indicating a work end time that is subsequent to the shift stop time;
   ascertaining a first time difference between the work start time and the shift start time;
   ascertaining a second time difference between the work end time and the shift stop time; and
   recording the work-related shift deficiency for the employee if the second time difference is less than the first time difference.

2. The method of claim 1, wherein the first indication is received after a certain time threshold after the shift start time.

3. The method of claim 1, wherein the employee is a contact center agent and the first indication comprises a log-in indication to a call handling system provided by the contact center agent.

4. A method for determining a work-related shift deficiency comprising:
   generating a work schedule by a scheduling system, the work schedule comprising a shift for an employee, the shift having a shift start time and a shift stop time;
   receiving a first indication from the employee at a time management system, the first indication indicating a work start time that is prior to the shift start time;
   receiving a second indication from the employee at the time management system, the second indication indicating a work end time that is prior to the shift stop time;
   ascertaining a first time difference between the work start time and the shift start time;
   ascertaining a second time difference between the work end time and the shift stop time; and
   recording the work-related shift deficiency for the employee if the second time difference is greater than the first time difference.

5. The method of claim 4, wherein the employee is a contact center agent and the second indication comprises a log-out indication to a call handling system provided by the contact center agent.

6. The method of claim 5, wherein the first indication comprises a log-in indication to the call handling system provided by the contact center agent.

7. A system for determining a work-related shift deficiency comprising:
   a processor configure to:
      receive a work schedule for an employee comprising a shift for the employee, the shift having a shift start time and a shift stop time;
      receive a first indication from the employee, the first indication indicating a work start time that is subsequent to the shift start time;
      receive a second indication from the employee, the second indication indicating a work end time that is subsequent to the shift stop time;
      ascertain a first time difference between the work start time and the shift start time;
      ascertain a second time difference between the work end time and the shift stop time; and
      record the work-related shift deficiency for the employee if the second time difference is less than the first time difference.

8. The system of claim 7, wherein the employee is a contact center agent and the processor is further configured to:
   receive the first indication as a result of the contact center agent logging into a call handling system; and
   receive the second indication as a result of the contact center agent logging off of the call handling system.

9. The system of claim 8, wherein the system is a workforce management system.

10. The system of claim 9, wherein the processor is further configured to:
    generate the work schedule for the employee.

11. A system for determining a work-related shift deficiency comprising:
    a processor configure to:

receive a work schedule for an employee comprising a shift for the employee, the shift having a shift start time and a shift stop time;

receive a first indication from the employee, the first indication indicating a work start time that is prior to the shift start time;

receive a second indication from the employee, the second indication indicating a work end time that is prior to the shift stop time;

ascertain a first time difference between the work start time and the shift start time;

ascertain a second time difference between the work end time and the shift stop time; and record the work-related shift deficiency for the employee if the second time difference is greater than the first time difference.

12. The system of claim 11, wherein the employee is a contact center agent and the processor is further configured to:

receive the first indication as a result of the contact center agent logging into a call handling system; and receive the second indication as a result of the contact center agent logging off from the call handling system.

13. The system of claim 11, wherein the processor is further configured to:

ascertain that the first time difference exceeds a threshold time period.

14. The system of claim 11, wherein the processor is further configured to:

store the work start time, the shift start time, the work end time, the shift stop time, and an employee identifier of the employee in a work history log.

15. A non-transitory computer readable medium storing instructions that when executed by a processor cause the processor to:

receive a work schedule for an employee comprising a shift for the employee, the shift having a shift start time and a shift stop time;

receive a first indication from the employee, the first indication indicating a work start time that is subsequent to the shift start time;

receive a second indication from the employee, the second indication indicating a work end time that is subsequent to the shift stop time;

ascertain a first time difference between the work start time and the shift start time;

ascertain a second time difference between the work end time and the shift stop time; and record a work-related shift deficiency for the employee if the second time difference is less than the first time difference.

16. The non-transitory computer readable medium of claim 15, wherein the instructions when executed further cause the processor to:

store the work start time, the shift start time, the work end time, the shift stop time, and an employee identifier of the employee in a work history log.

17. The non-transitory computer readable medium of claim 15, wherein the instructions when executed further cause the processor to:

ascertain the first time difference exceeds a specified time period.

18. A non-transitory computer readable medium storing instructions that when executed by a processor cause the processor to:

receive a work schedule for an employee comprising a shift for the employee, the shift having a shift start time and a shift stop time;

receive a first indication from the employee, the first indication indicating a work start time that is prior to the shift start time;

receive a second indication from the employee, the second indication indicating a work end time that is prior to the shift stop time;

ascertain a first time difference between the work start time and the shift start time;

ascertain a second time difference between the work end time and the shift stop time; and record a work-related shift deficiency for the employee if the second time difference is greater than the first time difference.

19. The non-transitory computer readable medium of claim 18, wherein the instructions when executed further cause the processor to:

ascertain the first time difference exceeds a specified time period.

20. The non-transitory computer readable medium of claim 19, wherein the instructions when executed further cause the processor to:

store the work start time, the shift start time, the work end time, the shift stop time, and an employee identifier of the employee in a work history log.

* * * * *